United States Patent [19]

Theodore et al.

[11] Patent Number: 4,568,474

[45] Date of Patent: Feb. 4, 1986

[54] POLYMERIC PARTICLE ACID NEUTRALIZERS WITH REACTIVE EPOXY CORE FOR ENGINE OILS

[75] Inventors: Ares N. Theodore, Farmington Hills; Mohinder S. Chattha, Livonia, both of Mich.

[73] Assignee: Ford Motor Company, Dearborn, Mich.

[21] Appl. No.: 689,401

[22] Filed: Jan. 7, 1985

[51] Int. Cl.$^4$ .............................................. C10M 1/28
[52] U.S. Cl. ................................. 252/52 R; 252/565; 523/436; 523/437; 523/463; 524/523; 524/923
[58] Field of Search .......................... 252/52 R, 56 R; 524/523, 923; 523/436, 437, 463

[56] References Cited

U.S. PATENT DOCUMENTS

| | | | |
|---|---|---|---|
| 3,317,635 | 5/1967 | Osmond et al. ..................... | 525/296 |
| 3,383,352 | 5/1968 | Duell et al. ......................... | 523/344 |
| 3,607,821 | 9/1971 | Clark et al. ......................... | 524/529 |
| 3,666,710 | 5/1972 | Makhlouf et al. ................... | 524/461 |
| 3,876,603 | 4/1975 | Makhlouf ............................ | 523/210 |
| 3,941,709 | 3/1976 | Herber et al. ................. | 252/56 R X |
| 4,075,141 | 2/1978 | Portet, Jr. et al. ..................... | 524/56 |
| 4,147,688 | 4/1979 | Makhlouf et al. ................... | 524/461 |
| 4,242,384 | 12/1980 | Andrew et al. ..................... | 427/421 |
| 4,461,713 | 7/1984 | Anzenberger ................ | 252/52 R X |
| 4,480,069 | 10/1984 | Theodore et al. ................... | 524/504 |
| 4,493,914 | 1/1985 | Chattha ........................... | 524/923 X |

Primary Examiner—Patrick P. Garvin
Attorney, Agent, or Firm—Lorraine S. Melotik; Roger L. May

[57] ABSTRACT

This invention is directed to acid neutralizing additives for engine oils, which additives comprise polymeric particles bearing epoxide groups on the polymerized particle and a non-polar polymeric stabilizer attached thereto.

14 Claims, No Drawings

POLYMERIC PARTICLE ACID NEUTRALIZERS WITH REACTIVE EPOXY CORE FOR ENGINE OILS

Reference is made to commonly assigned and concurrently filed U.S. application Ser. No. 689,402, entitled "Amine Bearing Polymeric Particles As Acid Neutralizers For Engine Oils", to Theodore et al.

TECHNICAL FIELD

This invention is directed to acid neutralizing additives for engine oils. In particular, this invention is directed to such acid neutralizing additives which comprise polymeric particles with a reactive epoxy polymer core and a non-polar stabilizer shell.

BACKGROUND OF THE INVENTION

Lubricating oils for gasoline-fueled internal combustion engines are usually formulated with a number of additives for enhancing their performance in service. In order to reduce corrosive engine wear due to the attack by acids resulting from incomplete fuel combustion or oil deterioration, engine lubricants generally contain additives which are alkaline materials. Among the principal additives are overbased sulfonate and phenate salts of alkaline earth metals. Commercially available additive concentrates generally comprise colloidal suspensions of calcium or magnesuim carbonate in an oil solution of calcium sulfonate having long non-polar chains. These overbased materials are stable dispersions with a maximum particle size of 100 angstroms. However, calcium carbonate particles are undesirably abrasive.

Recent interest in the development of methanol-fueled passenger vehicles has shown that currently available lubricating oil systems are not adequate for lubrication of methanol-fueled spark ignition engines. Formic acid generated by the incomplete combustion of methanol fuel may cause excessive piston ring and cylinder bore wear on engines operating at low temperatures. Although methanol-fueled engine development has continued with existing lubricating oils, the need for more effective lubricants has lately become very clear.

BRIEF DESCRIPTION OF THE INVENTION

The invention of this application is directed to a polymeric particle acid neutralizing additive bearing epoxide groups and a lubricating oil composition comprising this additive. The lubricating oil composition comprises a major proportion of lubricating base oil and about 0.1 to 15 weight percent of the acid neutralizing additive. The acid neutralizing additive of this invention comprises polymer particles (a) bearing pendant epoxide groups and (b) having a diameter of between about 500 Å and about 10,000 Å, preferably, on average, between about 500 Å and 3500 Å. These particles are formed by the free radical addition polymerization of:

(a) between about 50 and 100 weight percent of ethylenically unsaturated monomers bearing an epoxide group; and (b) 0 up to about 50 weight percent of other monoethylenically unsaturated monomers, in the presence of (I) a non-polar organic liquid which is a solvent for the polymerizable monomers, but a non-solvent for the resultant polymer, and (II) polymeric dispersion stabilizer containing at least two segments with one segment being solvated by the non-polar organic liquid and the second segment being of different polarity than the first segment and relatively insoluble in the non-polar organic liquid, which second segment of the stabilizer is chemically attached to the polymerized particle. Optionally, the stabilizer may also bear epoxide groups.

One advantage of the acid neutralizing oil additive of the invention of this application is that the additive acts to neutralize acid at the relatively low temperatures encountered by oils in methanol fueled engines, since the epoxy groups of the particles are unexpectedly very reactive with formic acid. The particles react with formic acid to form thermally stable particles having formate groups. Generally uncatalyzed reactions of model epoxy compounds and epoxy resin with carboxylic acids has been described only at much higher temperatures, e.g., 200° C.

Another advantage of the oil additive of this invention is that the additive particles have been found to improve the viscosity index of engine oils.

Still another advantage of the additive of this invention is that the outer shell stabilizer oligomers of the particles are inherently effective lubricants.

DETAILED DESCRIPTION OF THE INVENTION

This invention relates to an epoxide bearing polymeric acid neutralizing oil additive and to lubricating oil compositions comprising lubricating base oils and this additive. The lubricating base oil used in this invention may be a synthetic oil, straight mineral lubricating oil or a distillate derived from paraffinic, naphthenic, asphalic or mixed based crude, or if desired, various blends of these oils may be employed. This additive as well as optional materials which may be incorporated into the lubricating oil composition of this invention will be discussed hereinafter in greater detail.

The acid neutralizing additive employed in this invention comprises polymer particles (a) bearing pendant epoxide groups and (b) having an average diameter of between about 500–10,000 Å, preferably, on average, a diameter of between about 500–3500 Å. Since the polymer particles of this invention comprise the polymerized particle and the stabilizer attached thereto, the diameter of the particles includes that of the polymer core (formed by the polymerized monomers) and the surrounding stabilizer shell. The particles are formed by the free radical addition polymerization of: (a) between about 50 and about 100 weight percent of ethylenically unsaturated monomers bearing an epoxide group, and (b) 0 up to about 50 weight percent of other ethylenically unsaturated monomers, in the presence of: (I) a non-polar organic liquid which is a solvent for the polymerizable monomer, but a non-solvent for the resultant polymer and (II) polymeric dispersion stabilizer containing at least two segments, with one segment being solvated by the non-polar organic liquid and the second segment being of different polarity than the first segment and relatively insoluble in the non-polar organic liquid, which second segment of the stabilizer is chemically attached to the particle. Optionally, the stabilizer may also bear pendant epoxide groups.

The polymerizable monomers forming the particle comprise ethylenically unsaturated monomers bearing an epoxide group. Exemplary of this type of monomer are glycidyl ethers, such as allyl glycidyl ether and glycidyl esters of acrylic and methacrylic acid, i.e., glycidyl acrylate and glycidyl methacrylate. Preferably, the ethylenically unsaturated epoxide bearing monomers employed to form the particle are selected from glycidyl methacrylate and glycidyl acrylate. These epoxide group containing monomers comprise between about 50 and about 100 weight percent of the monomers used to form the particle, preferably they comprise greater than about 80 weight percent of the monomers forming the particle. As would be apparent to those in the art, a mixture of such monomers may be employed as this monomer component in forming the particles. Optionally up to about 50 weight percent of the monomers which are copolymerized to form the particle may be other ethylenically unsaturated monomers. Exemplary of such monomers are the alkyl esters of acrylic and methacrylic acid, particular those having about 1 to about 4 carbons in the alkyl group. Representative of such compounds are alkyl acrylates, such as methylacrylate, ethyl acrylate, propyl acrylate and the similar alkyl methacrylates. Other ethylenically unsaturated monomers which may be employed include, for example, the vinyl aromatic hydrocarbons, such as styrene, alpha-methyl styrene, vinyl toluene, unsaturated esters of organic and inorganic acids, such as vinyl acetate, vinyl chloride and the like, and the unsaturated nitriles, such as acrylonitrile, methacrylonitrile, ethacrylonitrile and the like. These other ethylenically unsaturated monomers may also include doubly unsaturated monomers such as butadiene which are capable of polymerizing in a vinyl-type manner. As will be appreciated by one skilled in the art, a mixture of these other ethylenically unsaturated monomers may be employed in particle formation. Preferably, the polymerized particle formed is not a crosslinked particle, however it may be lightly crosslinked by including ethylenically unsaturated monomers which contain a pendant group reactive with the epoxide group of the particle forming monomers, e.g., an acid group. Thus, by including in the particle forming monomers a small amount of a monomer such as methacrylic acid, the particle may be lightly crosslinked. Monomers of this type which would crosslink the particle are preferably not included in particle formation, but when included, are only included in an amount of up to about 2 weight percent, preferably in an amount less than about 1 weight percent of the polymerizable monomers forming the particle. By not crosslinking or only lightly crosslinking the particles as described, the particles are more permeable to the base oil to which they are employed and thus will be more effective as acid neutralizing additives therein.

The ethylenically unsaturated monomer or monomers are polymerized in a dispersing liquid which solubilizes the monomers but in which the resulting polymers are essentially not soluble and form dispersed polymer particles. The non-solvent is generally a hydrocarbon medium consisting essentially of liquid aliphatic hydrocarbons. A pure aliphatic hydrocarbon or a mixture of two or more be employed. To the extent that any particular polymer produced is mostly insoluble in the hydrocarbon medium resulting, the essentially aliphatic hydrocarbon may be modified by the incorporation of other solvent materials such as aromatic or naphthenic hydrocarbons, and in certain instances the amount of such non-aliphatic component may attain as high as 49 percent by weight of the entire liquid medium. However, the liquid medium preferably consists essentially of aliphatic hydrocarbons and, in general the compositions of the present invention contain less than 25 percent by weight based on the weight of the liquid medium of an aromatic hydrocarbon and often none at all at this stage.

It is essential that the hydrocarbon be of liquid character, but it may have a wide boiling range from a minimum of about 30° C. (in which case high pressures may be needed in the polymerization) to a maximum which may be as high as 300° C. For most purposes, the boiling point should be from about 50° up to about 235° C. A great many such non-polar solvents are available and known to those skilled in the art. Exemplary of such solvents which may be employed in forming the acid neutralizing additive particles are heptane, octane, hexane and mixtures of aliphatic hydrocarbons with boiling points of 50°-250° C. A variety of suitable solvents would be well known to those skilled in the art. Commercially available suitable solvents include WM & P Naphtha, Lacolene (available from Ashland Chemical) and Isopar (available from Exxon).

The dispersion stabilizer used in this invention contains at least two segments, one segment being solvated by the non-polar organic liquid and the second segment being of different polarity than the first segment and relatively insoluable in the non-polar organic liquid. This second segment of the stabilizer is chemically attached to the polymerized particle. The polymeric dispersion stabilizer attaches to the polymer core of the particle during particle formation by means of pendant groups, e.g., ethylenic unsaturation, hydroxyl, carboxyl, on the second segment, which may react with the ethylenically unsaturated monomers in the polymerization process used to make the dispersed particle. Preferably such chemical attachment is by way of addition copolymerization of the ethylenically unsaturated monomers used to prepare the particle with the ethylenic unsaturation on the second segment of the polymeric dispersion stabilizer. However such chemical attachment may include that formed by reaction between other reactive groups respectively present on the particle monomers and the second segment of the stabilizer, e.g., epoxide and carboxyl. Various types of such polymeric dispersion stabilizers are well known in the art. U.S. Pat. Nos. 3,666,710, 4,147,688, 3,876,603 to Makhlouf et al teach dispersion stabilizers which are generally polymeric and contain two segments, with one segment being solvated by the dispersion liquid and the second segment being of different polarity than the first segment, and relatively insoluble, compared to the first segment, in the dispersion medium. Included among the dispersion stabilizers in the Makhlouf patents are polyacrylates and methacrylates, such as (poly)lauryl methacrylates, and poly(2-ethylhexylacrylate); diene polymers and copolymers such as polybutadiene and degraded rubbers; aminoplast resins, particularly highly naphtha tolerant compounds such as melamine formaldehyde resins etherified with higher alcohols (e.g., alcohols having 4 to 12 carbon atoms); and various copolymers designed to have desired characteristics. (See column 5, lines 1-27 of U.S. Pat. No. 4,147,688). Another dispersion stabilizer which may be employed in this invention comprise those taught by Clarke et al in U.S. Pat. No. 3,607,821 wherein the stabilizer is chemically reacted with dispersed particles of a dispersion (column 1, lines 36-42). Each coreacted stabilizer molecule forms from 1 to 10 (preferably 1 to 4) covalent links with disperse polymer. The covalent links between the stabilizer and disperse polymer is formed by coreaction between chemical groups provided by the stabilizer and complementary chemical groups provided by the disperse polymer or by copolymeriation reaction (column 1, lines 63-67). Other suitable dispersion stabilizers for use in this invention are taught in U.S. Pat. No. 4,075,141 to Porter, Jr. et al, U.S. Pat. No. 3,317,635 to Osmond, U.S. Pat. No. 4,242,384 to Andrew et al, and U.S. Pat. No. 3,383,352, to Duell et al. Still other polymeric dispersion stabilizers which may be employed in the invention of this application include those taught in U.S. Pat. No. 4,480,069 to Theodore et al and the stabilizers taught in the applications referenced therein at column 1, lines 6–23: U.S. applications Ser. No. 455,696, now U.S. Pat. No. 4,533,695 entitled "Non-aqueous Dispersions Based on Capped Stabilizers and Reactants Comprising Polyfunctional Monomers II", Ser. No. 455,687, now U.S. Pat. No. 4,528,317 entitled "Non-aqueous Dispersions Based on Capped Stabilizers and Vinyl Monomers II", and Ser. No. 455,701 now U.S. Pat. No. 4,530,957, entitled "Non-aqueous Dispersions Based on Capped Stabilizers and Reactants Comprising Polyfunctional Monomers I", all to Theodore et al and filed on Jan. 5, 1983. Further reference is made to commonly assigned related U.S. applications, Ser. No. 468,901 entitled "Preparation of Non-aqueous Dispersions with use of Monofunctional Stabilizer" to Chattha et al., Ser. No. 468,902, now U.S. Pat. No. 4,493,914 entitled "Corosslinked Flow Control Additives for High Solids PaintsII" to Chattha, and Ser. No. 468,912, now U.S. Pat. No. 4,533,681, entitled "Crosslinked Flow Control Additives for High Solids Paints I" to Cassatta et al, all filed Feb. 23, 1983. The stabilizers taught in the Theodore et al patent and the noted applications, contain pendant groups capable of copolymerizing with the ethylenically unsaturated monomers used to form the particles of the dispersion. However, Theodore et al teach that the reaction between the stabilizer and the polymerized particles may include that between other reactive groups respectively present on the particle monomers and dispersion stabilizer. The above discussed patents and applications are herein expressly incorporated by reference for their teachings relative various dispersion stabilizers, which stabilizers may be employed in the invention of this application.

The preferred dispersion stabilizers taught by Makhlouf in U.S. Pat. No. 4,147,688 are graft copolymers comprising two types of polymer components wherein the first component comprises the condensation reaction product of 12-hydroxystearic acid reacted with glycidyl methacrylate. The second polymeric segment of the stabilizer is formed by reacting the first segment with methyl methacrylate, glycidyl methacrylate, and subsequently methacrylic acid. This second segment thus contains ethylenic groups copolymerizable with the acrylic monomers employed to form the particle. A preferred dispersion stabilizer taught by Theodore et al in U.S. Pat. No. 4,480,069 comprises a first segment of a capped poly(12-hydroxystearic acid) reacted with glycidyl methacrylate, which first segment is subsequently reacted with methyl methacrylate, hydroxyethyl methacrylate, and subsequently isocyanatoethyl methacrylate to provide vinyl groups on the second segment which are copolymerizable with the monomers forming the particle. These polymeric stabilizers are simply exemplary of the type of polymeric stabilizers which may be employed in the invention of this application.

It has also been found that the acid neutralizing ability of the dispersed particles in the lubricating oil can be increased by introducing additional epoxide groups into the stabilizer which surrounds the particle, i.e., in addition to that present in the epoxy core of the particle. This can be done, for example, by including an epoxide functional monomer with those used to form the second segment of the preferred stabilizer taught in U.S. Pat. No. 4,480,069 so that such epoxide groups remains as pendant functionality on the second segment of the stabilizer. As noted above, in U.S. Pat. No. 4,480,069, the second segment of the preferred stabilizer could be made by reacting the first segment with methyl methacrylate and hydroxyethyl methacrylate, and then reacting this graft copolymer with isocyanatoethyl methacrylate. If one wish to introduce epoxy groups in the second segment of the stabilizer, glycidyl methacrylate could be included with the methyl methacrylate and the hydroxyethyl methacrylate to form the graft copolymer which would be subsequently reacted with the isocyanatoethyl methacrylate. Thus ethylenic unsaturation would be added on the second segment of the stabilizer by reaction of the hydroxyethyl methacrylate with the isocyanatoethyl methacrylate, and in addition pendant epoxide groups would be present thereon from the incorporation of glycidyl methacrylate. While this preferred stabilizer of Theodore et al has been used to illustrate one way in which epoxide groups may also be present in the stabilizer, this invention is not meant to be limited to this embodiment for incorporating epoxide groups on the stabilizer. Other stabilizer embodiments, which may be modified so as to contain pendant epoxide groups would be apparent to and within the skill of those in the art.

The particles of this invention may be left as dispersions in the solvent employed in particle formation or the solvent employed in particle formation can be removed. The particles, when present as a dispersion in the solvent or as a dry powder, can be employed as acid neutralizers in oil compositions. Generally however, when employed as an oil additive, the particles would be left as a dispersion in the solvent in which they were formed, i.e. employed as an additive concentrate.

The lubricating oil composition of this invention may also include other additives, commonly employed in oil formulations such as pour point depressants, rust inhibitors, detergents, foam depressants and additives which are included for their antioxidant and antiwear properties.

Although the oil additive of this invention has been described as useful in lubricating oils employed in engines running on methanol containing fuels, the use of the additive and oil composition containing the additive of this invention is not limited to such use. They may be employed wherever a lubricating oil composition having good acid neutralizing properties is desired.

The following examples are presented by way of description of the composition of the invention and set forth the best mode contemplated by the inventor but are not to be construed as limiting.

EXAMPLE 1

Stabilizer Preparation

Capped poly(12-hydroxystearic acid)

12-hydroxystearic acid (2410.00 g) and xylene (500.00 g) were heated to obtain a solution. Tetraisopropyl titanate (1.50 g "Tyzor" TPT, DuPont) was added to the solution and refluxed for 30 hours under a Dean-Stark water separator to collect 106.00 g water. Fifty grams of stearic acid were added to the reaction mixture and refluxing was continued for ten hours until no more water was collected. Infrared spectrum of product showed complete disappearance of the hydroxy absorption band. The molecular weight ($M_w/M_n$) of product was 4195/2110=1.99.

Macromonomer

One gram of Cordova accelerator AMC ™ 2 was added to the above solution and heated to 75° C. Glycidyl methacrylate (158.00 g) was added dropwise to the solution with continuous stirring. The reaction mixture was stirred at 75° C. for two hours and at 85° C. for sixteen hours. Infrared spectra of the product displayed hydroxy absorption band (3350–3600 cm$^{-1}$) but the glycidyl group band (916 cm$^{-1}$) was not present. Its molecular weight was $M_w/M_n$=4420/2220 and its solids content was 72%.

Stabilizer Precursor and Stabilizer

The monomers (253.70 g macromonomer II, 187.00 g methyl methacrylate and 22.50 g hydroxyethyl methacrylate) and 5.00 g AIBN in 70.00 g butyl acetate were combined and added dropwise to the refluxing butyl acetate (213.00 g) in 4.5 hours under nitrogen. 2,2'-Azobis(2-methylpropionitrile) (AIBN, 1.00 g in 30.00 g butyl acetate) was added to the reaction mixture and refluxing was continued for two additional hours. To the above stabilizer precursor solution hydroquinone (HQ, 0.66 g in 10.00 g butyl acetate and 10.00 g heptane) was added. After cooling the reaction mixture to 60° C., 0.25 g dibutyltin dilaurate (DBTDL) and 6.50 g isocyanatoethyl methacrylate (IEM) dissolved in aliphatic hydrocarbon (50.00 g, b.p. 127°–140° C.) were added dropwise. The mixture was stirred at 60° C. until the isocyanate group disappeared completely as indicated by infrared spectra (2270 cm$^{-1}$). The stabilizer solution was diluted with aliphatic hydrocarbon (B.P. 127°–140° C.) to a solids content of 42%. The molecular weight ($M_w/M_n$) of the product was 17400/7330=2.40.

Preparation of nonaqueous dispersion

In an one-liter flask equipped with condenser, gas inlet tube, thermometer, sample port and mechanical stirrer was charged 177.00 g heptane. As the temperature was raised to the boiling point of heptane, glycidyl methacrylate (7.00 g), stabilizer (1.60 g) and AIBN (1.00 g) were rapidly poured into the flask. After refluxing the reaction mixture for 35 minutes, the following mixture was added dropwise over a period of three hours under a nitrogen atmosphere: stabilizer (28.00 g), glycidyl methacrylate (160.00 g), 1-octanethiol (1.75 g), 2,2'-azobis(2-methylpropionitrile) (AIBN, 0.70 g), and aliphatic hydrocarbon (B.P. 127°–140° C., 60.00 g). Upon completion of monomer addition, 0.20 g AIBN in 3.00 g butyl acetate were added. Refluxing was continued for two additional hours. Solids content was 39.80%, average particle size 0.30 μm and viscosity at 25° C. was 9.8 seconds (Ford Cup #4).

Oil formulations were prepared by adding the above nonaqueous dispersion to Mobil 1 (base stock) lubricating oil with stirring. The hydrocarbon solvent was removed from the oil composition by heating at 75° C. under vacuum and with stirring for 3–5 hours. The resulting master batch contained 20% polymeric particles in oil and was employed in preparing oil compositions containing 0.69, 3.00 and 6.20% particles in oil. Increasing the amount of particles in oil resulted in compositions with higher viscosity. The viscosity data also indicates that these oil compositions exhibit a small viscosity index improver effect in the temperature range of 25°–70° C. An oil formulation (55.00 g) containing 3.5% particles was combined with 0.60 g formic acid and the mixture was stirred for 5 minutes. The unreacted epoxy content (R. R. Fay Anal. Chem. Vol. 36, No. 3, pp 667–668 (1964), and acid content (ASTM D664-81, Cresol red indicator) were determined at various time intervals. Most epoxy groups are consumed by the formic acid in 150 hours at 25° C.

EXAMPLE 2

The procedure of Example 1 was repeated with the exception of the preparation of nonaqueous dispersion. Heptane-aliphatic hydrocarbon (B.P. 127°–140° C., heptane/aliphatic hydrocarbon weight ratio=77/23) was charged under nitrogen in a round bottom flask equipped with a condenser, gas inlet tube, thermometer sample port and mechanical stirrer. As the solvent was brought to reflux, glycidyl methacrylate (7.00 g), stabilizer (2.00 g) and AIBN (0.50 g) were added rapidly. After refluxing the reaction mixture for thirty minutes, the following mixture was added dropwise over a period of 3.5 hours under a nitrogen atmosphere: stabilizer (84.00 g), glycidyl methacrylate (160.00 g), 1-octane thiol (1.75 g), AIBN (0.70 g) and styrene (10.00 g). After completion of monomer addition, 0.50 g of AIBN in 5.00 g butyl acetate were added. The dispersion was refluxed with stirring for four additional hours. Solids content was 41%, average particle size 0.265 μm, and viscosity at 25° C. was 10.1 sec. (Ford Cup #4).

A mixture was formed by combining the above dispersion (10.00 g) with formic acid (1.20 g). The mixture was shaken at 25° C. and unreacted epoxy group and formic acid were determined as in Example 1. Over 90% of epoxy groups were consumed in 60 hours. When the same reaction was carried out at 55° C. and 72° C., most of epoxy groups were consumed in 50 and 110 minutes respectively. The reaction of epoxy particles with formic acid at 25°, 55° and 72° C. had no effect on the particle size.

EXAMPLE 3

The procedure of Example 2 was repeated with the exception that oil formulations were prepared. Mobil 1 oil (100.00 g) was combined with a master batch (19.20 g) prepared from the dispersion of Example 2, (22% solids) to form an oil composition. The oil dispersion was stable for several months.

An oil formulation containing equimolar amounts of epoxy particles and formic acid was prepared. The decrease of epoxy groups and formic acid was followed by titrating the mixture as in Example 1. Residual epoxy groups were observed after continuing the reaction at 25° C. for 300 hours. However, the epoxy-acid reaction at 60° C. is much faster and the epoxy groups are completely consumed after 25 hours.

EXAMPLE 4

Example 1 was repeated with the exception that an oil formulation (55.00 g) containing 3.5% epoxy particles was combined with 0.25 g formic acid. The formic acid was completely consumed by the epoxy particles. Keeping the reaction mixture at 60° C. for 265 hours had no effect on epoxy group concentration.

EXAMPLE 5

Example 1 is repeated with the exception in the composition of oil formulation. An oil formulation (60.00 g) containing 6.00% epoxy particles was combined with 1.00 g of formic acid. The epoxy groups reacted with the formic acid at room temperature.

EXAMPLE 6

Example 1 is repeated with the exception in the composition of oil formulation. An oil formulation (65.00 g) containing 12% epoxy particles was combined with 1.50 g of formic acid. The epoxy groups decreased with time.

EXAMPLE 7

The procedure of Example 1 was repeated with the exception in the preparation of nonaqueous dispersion. Heptane-aliphatic hydrocarbon (76/24) was charged under nitrogen in a round bottom flask. As the solvent (180.00 g) was brought to reflux, part of reactant (4.00%) consisting of glycidyl methacrylate (GMA), stabilizer, AIBN and 1-octane thiol was added rapidly with stirring. After refluxing the reaction mixture for 30 minutes, the remaining reactants (56.00 g stabilizer, 160.00 g glycidyl methacrylate, 1.75 g 1-octanethiol and 0.70 g AIBN) were added dropwise over a four hour period with continuous refluxing and stirring. A solution of 0.20 g AIBN in 3.00 g butyl acetate was added after the monomer addition was complete. Refluxing was continued for an additional two hours. Oil formulations were prepared as in Example 1 and were found to neutralize formic acid.

EXAMPLE 8

Example 1 was repeated with the exception in the preparation of dispersion. The nonaqueous dispersion was identical to Example 1 but 114.00 g of stabilizer were incorporated with the other ingredients. The average particle size of the particles was 0.202 μm and the viscosity of the dispersion was 10.4 seconds at 25° C. (Ford Cup #4). Oil formulations containing these particles were suitable for neutralizing formic acid.

EXAMPLE 9

The macromonomer was prepared as in Example 1 but the stabilizer precursor was prepared as follows: macromonomer (220.00 g), methyl methacrylate (180.00 g), hydroxyethyl methacrylate (10.00 g), glycidyl methacrylate (36.00 g) and AIBN (5.00 g). These monomers were added to butyl acetate as in Example 1. The resulting graft copolymer was reacted with isocyanatoethyl methacrylate (6.5 g) to form the stabilizer. Dispersions formed from this stabilizer were stable and neutralized formic acid efficiently.

EXAMPLE 10

Example 1 was repeated with the exception in the preparation of stabilizer precursor and stabilizer. The monomers (210.00 g macromonomer, 186.00 g methyl methacrylate and 45.00 g glycidyl methacrylate) and 5.00 g AIBN were combined and added dropwide to the refluxing butyl acetate (210.00 g) in four hours under nitrogen atmosphere. After monomer addition was complete, AIBN (1.00 g) was added to the reaction mixture and it was refluxed for 2.5 additional hours. The solids content of stabilizer precursor was 54% and its molecular weight ($M_w/M_n$) 10220/4800. Hydroquinone (0.60 g in 10.00 g butyl acetate was added to the stabilizer solution. After raising the temperature of reaction mixture to 125° C., 0.25 g dimethyl dodecyl amine and 3.50 g methacrylic acid dissolved in aliphatic hydrocarbon (40.00 g, B.P. 127°–140° C.) were added rapidly.

The mixture was refluxed for seven hours. The above stabilizer was employed in preparing dispersions as in Example 1. The resulting particles neutralized formic acid efficiently.

EXAMPLE 11

Example 10 was repeated with the exception that the following monomer mixture was employed in preparing the stabilizer precursor: macromonomer (255.00 g), methyl methacrylate (56.00 g), glycidyl methacrylate (175.00 g) and AIBN (5.00 g). Dispersions prepared from this stabilizer were not as suitable as those of Example 10 for use in engine oils as acid neutralizers.

EXAMPLE 12

The experimental procedures of Example 1 are repeated with the exception in the preparation of nonaqueous dispersion. Heptane-aliphatic hydrocarbon (75/25) was charged under nitrogen in a round bottom flask. As the solvent (190.00 g) was brought to reflux, part of the reactants (4.0%) consisting of glycidyl methacrylate (GMA), macromonomer, AIBN and 1-octanethiol was added rapidly with stirring. After refluxing the reaction mixture for 30 minutes, the remaining reactants (65.00 g macromonomer, 160.00 g glycidyl methacrylate, 1.75 g 1-octanethiol and 0.65 g AIBN) were added dropwise over a four hour period with continuous refluxing and stirring. A solution of 0.20 g AIBN in 3.00 g butyl acetate was added after the monomer addition was complete. Refluxing was continued for one additional hour. Oil formulations prepared according to procedure of Example 1 were found to neutralize formic acid.

EXAMPLE 13

The procedures of example 10 were repeated with the single exception that the monomer mixture employed in preparing the stabilizer precursor contained hydroxyethyl methacrylate (5.00 g) in addition to the other monomers. Particles stabilized by this stabilizer were dispersible in a highly refined, mineral base white oil. These particles were found to react with organic acids.

EXAMPLE 14

Example 1 was repeated with the exception that the monomer mixture in preparing the stabilizer precursor and stabilizer contained equimolar amounts of methacrylic acid and glycidyl methacrylate in place of hydroxyethyl methacrylate and isocyanato ethyl methacrylate. The resulting particles were dispersed in a lubricating oil (SAE viscosity grade=10W). This composition was suitable for neutralizing formic acid.

EXAMPLE 15

The preparations of Example 1 were repeated with the exception that the particles were dispersed in a lubricating oil (SAE viscosity grade=20) obtained from Louisiana crude. The dispersion neutralized organic acids.

EXAMPLE 16

The procedures of Example 1 were repeated with the single exception that the particles were dispersed in a dibasic acid ester basestock obtained by the reaction of sebasic acid and isodecyl alcohol. The formulation neutralized formic acid.

EXAMPLE 17

Example 1 was repeated with the single exception that the particles were dispersed in a 50:50 blend of dibasic acid ester (Example 16) and mobil one basestock. The dispersion neutralized organic acids.

EXAMPLE 18

Example 1 was repeated with the exception that a different material was employed in the stabilization of particles. Heptane-aliphatic hydrocarbon (b.P. 127°-140° C., heptane-aliphatic hydrocarbon weight ration=77/23) was charged under mitrogen in a round bottom flask as in example 1. As the solvent was brough to reflux, the following monomer mixture was added dropwise over a period of three hours: 90.00 g. macromonomer; 160 g glycidyl methacrylate, 1.75 g 1-octomethiol, 0.70 g AIBN and 60 g aliphatic hydrocarbon (b.p. 127-140). The resulting particles were dispersed in Mobil 1 base stock and were capable of reacting with formic acid.

EXAMPLE 19

The procedures of example 1 are repeated with the exception in the preparation of macromonomer. One gram of Cordova accelerator AM TM 2 was added to a poly(12-hydroxy stearic acid) (2400.00 g, $M_n$=1700) solution (72% solids) and heated to 75° C. Glycidyl methacrylate was reacted wit the poly acid as in example 1. The stabalizer and particles were prepared as in example 1. Oil formulations (Mobil 1 base stock) containing 4% epoxy particles were stable and capable of reacting with formic acid.

In view of the disclosure, many modifications of this invention will be apparent to those skilled in the art. It is intended that all such modifications which falls within the true scope of this invention be included within the terms of the appended claims.

We claim:

1. An acid neutralizing lubricating oil additive comprising polymer particles (a) bearing pendant epoxide groups, and (b) having a diameter of between about 500 and 10,000 Å, which particles are formed by the free radical addition polymerization of:
   (a) between about 50 and about 100 weight percent of ethylenically unsaturated monomers bearing an epoxide group, and
   (b) 0 up to 50 weight percent of other monoethylenically unsaturated monomers; in the presence of: (I) a non-polar organic liquid which is a solvent for the polymerizable monomers, but a non-solvent for the resultant polymer, and (II) polymeric dispersion stabilizer containing at least two segments, with one segment being solvated by said non-polar organic liquid and the second segment being of different polarity than said first segment and relatively insoluble in said non-polar organic liquid, which said second segment of said stabilizer is chemically attached to the polymerized particle.

2. A lubricating oil additive according to claim 1, wherein said monomers bearing an epoxide group are selected from (a) glycidyl ethers, and (b) glycidyl esters of acrylic and methacrylic acids.

3. A lubricating oil additive according to claim 1, wherein said ethylenically unsaturated monomers bearing an epoxide group comprise greater than about 80 weight percent of said monomers forming said particles.

4. A lubricating oil additive according to claim 1, wherein said polymeric stabilizer is chemically attached to said polymerized particle during particle formation through reaction of said polymerizable monomers with reactive groups present on said second segment of said stabilizer, which reactive groups comprise groups capable of (a) reacting with epoxide groups or (b) copolymerizing with ethylenically unsaturated monomers.

5. A lubricating oil additive according to claim 4, wherein said reactive groups are selected from ethylenic unsaturation, carboxyl groups, and hydroxyl groups.

6. A lubricating oil additive according to claim 1, wherein said particle diameter is, on average, between about 500°-3500 Å.

7. A lubricating oil additive according to claim 1, wherein said second segment of said stabilizer bears pendant epoxide groups.

8. A lubricating oil composition comprising a major proportion of a lubricating base oil and about 0.1 to 15 weight percent of an acid neutralizing additive which comprises polymer particles (a) bearing pendant epoxide groups, and (b) having a diameter of about 500-10,000 Å, which particles are formed by the free radical addition polymerization of:
   (a) between about 50 and about 100 weight percent of ethylenically unsaturated monomers bearing an epoxide group, and
   (b) 0 up to about 50 weight percent of other monoethylenically unsaturated monomers; in the presence of: (I) a non-polar organic liquid which is a solvent for the polymerizable monomers, but a non-solvent for the resultant polymer, and (II) polymeric dispersion stabilizer containing at least two segments, with one segment being solvated by said non-polar organic liquid and the second segment being of different polarity than said first segment and relatively insoluble in said non-polar organic liquid, which said second segment of said stabilizer is chemically attached to the polymerized particle.

9. A lubricating oil composition according to claim 8, wherein said monomers bearing an epoxide group are selected from (a) glycidyl ethers, and (b) glycidyl esters of acrylic and methacrylic acids.

10. A lubricating oil composition according to claim 8, wherein said ethylenically unsaturated monomers bearing an epoxide group comprise greater than about 80 weight percent of said monomers forming said particles.

11. A lubricating oil composition according to claim 8, wherein said polymeric stabilizer is chemically attached to said polymerized particle during particle formation through reaction of said polymerizable monomers with reactive groups present on said second segment of said stabilizer, which reactive groups comprise groups capable of (a) reacting with epoxide groups or (b) copolymerizing with ethylenically unsaturated monomers.

12. A lubricating oil composition to claim 11, wherein said reactive groups are selected from ethylenic unsaturation, carboxyl groups, and hydroxyl groups.

13. A lubricating oil composition according to claim 8, wherein said particle diameter is, on average, between about 500-3500 Å.

14. A lubricating oil composition according to claim 8, wherein said second segment of said stabilizer bears pendant epoxide groups.

* * * * *